United States Patent
Huhmarkangas et al.

(10) Patent No.: US 7,077,412 B2
(45) Date of Patent: Jul. 18, 2006

(54) SUSPENSION OF WHEELS IN A WORKING MACHINE

(75) Inventors: Arto Huhmarkangas, Tampere (FI); Markku Jaatinen, Julkujärvi (FI); Sami Arola, Tampere (FI); Arto Vento, Tampere (FI); Jouko Hyytiäinen, Tampere (FI)

(73) Assignee: John Deere Forestry Oy, Tampere (FI)

( * ) Notice: Subject to any disclaimer, the term of this patent is extended or adjusted under 35 U.S.C. 154(b) by 0 days.

(21) Appl. No.: 11/167,876

(22) Filed: Jun. 27, 2005

(65) Prior Publication Data

US 2005/0248115 A1    Nov. 10, 2005

Related U.S. Application Data

(63) Continuation of application No. 10/221,063, filed as application No. PCT/FI01/00157 on Feb. 19, 2001, now Pat. No. 6,962,359.

(30) Foreign Application Priority Data

Mar. 10, 2000  (FI)  .................................. 20000547

(51) Int. Cl.
    *B60G 3/04*  (2006.01)
(52) U.S. Cl. .............................................. 280/124.134
(58) Field of Classification Search ......... 280/124.134, 280/124.135, 124.136, 124.138, 124.139
    See application file for complete search history.

(56) References Cited

U.S. PATENT DOCUMENTS

| 1,650,544 | A | 11/1927 | Sizaire |
| 3,806,141 | A | 4/1974 | Janer |
| 4,186,815 | A | 2/1980 | Hart |
| 4,565,486 | A | 1/1986 | Crawford et al. |
| 5,337,847 | A | 8/1994 | Woods et al. |
| 5,437,467 | A | 8/1995 | Patin |
| 5,931,486 | A | 8/1999 | Andreis |

FOREIGN PATENT DOCUMENTS

| DE | 36 32 416 A | 4/1988 |
| FR | 2 651 751 A | 3/1991 |
| FR | 2 652 313 A | 3/1991 |
| WO | WO 89/00928 A | 2/1989 |

*Primary Examiner*—Faye M. Fleming
(74) *Attorney, Agent, or Firm*—Quarles & Brady LLP

(57) ABSTRACT

An arrangement for the suspension of wheels of a working machine moving on a terrain, the arrangement comprising a pair of adjacent wheels arranged to support a frame part placed on a center line between the wheels; suspensions arranged between each wheel and the frame part to elevate and descend each wheel with respect to the frame part, wherein each suspension comprises a lower suspension arm and an upper suspension arm, which lower suspension arms are mounted by means of first joints to the frame part and by means of second joints to mounting arms, in which the wheels are mounted in a rotatable manner, and which upper suspension arms are fixed by means of third joints to the frame part and by means of fourth joints to the mounting arms, wherein, in each suspension, the first joint and/or the third joint is placed on said center line.

20 Claims, 4 Drawing Sheets

SUSPENSION OF WHEELS IN A WORKING MACHINE

CROSS-REFERENCE TO RELATED APPLICATION

This application is a continuation of and claims priority to U.S. application Ser. No. 10/221,063, filed Sep. 9, 2002 now U.S. Pat. No. 6,962,359, which claims priority to PCT application PCT/FI01/00157 filed Feb. 19, 2001, which claims priority to Finnish application 20000547 filed Mar. 10, 2000.

BACKGROUND OF THE INVENTION

1. Field of the Invention

The invention relates to an arrangement for the suspension of wheels in a working machine movable on a terrain.

2. Description of the Related Art

For harvesting, working machines are known which move on a terrain by means of wheels, including harvesters in which a harvesting device is provided at the end of a boom assembly, a so-called harvester head for cutting and felling a tree stem and sawing it to pieces of desired length. The sawn tree stems are collected by a loading apparatus, i.e. a forwarder equipped with a grapple, and transported in the load space.

Publication WO 89/00928 discloses a working machine which comprises two frames connected to each other by means of a joint. The joint is used to control the direction of motion, wherein the working machine is provided with articulated steering. A swivel base is mounted on the frame to swivel around a vertical axis and is equipped with a cabin and, by its side, a boom assembly, a harvester head being mounted at the end of the boom assembly. In a known manner, the boom assembly can also be mounted in front of the cabin or on a swivel base separate from the cabin. In forwarders, one of the frames is equipped with a load space where the tree stems are collected from the ground by means of a grapple mounted on the frame. The other frame is equipped with a cabin and a power source for the working machine. So-called combined machines are also known, combining the functions of a harvester and a forwarder. In this case, for example, the rear frame in the harvester is equipped with a load space. The advantage is that the harvesting and the collection of the tree stems can be performed simultaneously, wherein the need for several machines in the forest is reduced, which also reduces damage caused to growing stock.

For example in forest thinning, several growing trees are left by the side of the logging road used by the working machine, which limits the space available for the working machine, particularly in the width direction. In the working machine according to the WO publication, the suspension of wheels is implemented with a joint parallelogram comprising articulated, parallel upper and lower suspension arms. A cylinder for controlling the position of the wheel is coupled between the joint of the upper suspension arm on the frame side and the joint of the lower suspension arm on the wheel side. The joint parallelogram also keeps the wheel vertical in different positions.

The suspension of wheels is problematic particularly when there is a need to limit the dimensions of the working machine, particularly its width and height, without affecting the other properties, particularly the capability to proceed on the terrain. The problem is that the cylinder is mounted at a point where the piston stroke of the cylinder becomes very long for moving the wheel from the upper position to the lower position. For this reason, the arms also become long, to fit the cylinder in between, both short and long, which affects particularly the width of the working machine, and it is particularly difficult to make the long suspension arms steadfast.

Another problem is that when there is a need to reduce the width of the working machine, the moment arm of the cylinder must be made shorter, wherein said suspension arms must be made shorter. The moment arm is formed by the transverse distance between the cylinder and the joint of the lower suspension arm on the frame side. Reducing the length of the suspension arms will also cause that the play between the upper position and the lower position is reduced. In particular, the moment arm is reduced when the joints of the lower and upper suspension arms on the frame side are brought closer to each other to limit the height of the frame. The reduction of the length of the tension arm increases the power required of the cylinder, leading to a larger cylinder and/or a higher pressure level, which is not always preferred. Consequently, a modification of the presented wheel suspension, particularly a modification of the length of and distance between the suspension arms, will strongly affect the moment arm, wherein it is difficult to modify the structure, particularly the mountings.

SUMMARY OF THE INVENTION

The present invention eliminates the above-presented problems by means of a wheel suspension without increasing the width of the working machine, decreasing the steerability and complicating the constructions.

According to an embodiment of the invention, the corresponding joints of the joint parallelograms of the wheels placed on different sides of the frame, on the frame side, are placed on the same axis of rotation. In other words, the joints of the upper suspension arms are placed on the same axis of rotation and/or the joints of the lower suspension arms are placed on the same axis of rotation. The rotation axes are preferably placed on the center line of the working machine. Thus, the width of the working machine can be reduced, particularly at the location of the wheels, without reducing the length of the moment arms. Without affecting the width, the working machine can also be equipped with wider tyres, or the wheels can be equipped with large turning cylinders for steering the wheels.

By placing the cylinder in a vertical position and mounting its one end to the lower suspension arm and its other end to the frame, it is possible to reduce the piston stroke of the cylinder. However, the moment arm of the cylinder can be kept substantially the same as before, but the mounting point in the lower arm can be shifted closer to the frame. Thus, there will be more space for other structures at the outermost end of the suspension arms. Thanks to the shorter piston stroke, the vertical cylinder does not harmfully increase the height of the structure. As the mounting point is placed in the suspension arm and not in its joint, a change in the length of the suspension arm will not necessarily affect the structure of the cylinder, the pressure levels used, or particularly the moment arm. With the vertical position, also the moment arm formed by the suspension arms in different positions will be less changed when the wheel moves up and down.

Another embodiment of the invention provides a compact module structure for the wheel suspension and the frame structure in various working machines.

BRIEF DESCRIPTION OF THE DRAWINGS

In the following, the invention will be described in more detail by using as examples some embodiments of the invention with reference to the appended drawings, in which.

DETAILED DESCRIPTION OF THE DRAWINGS

Figure 1:
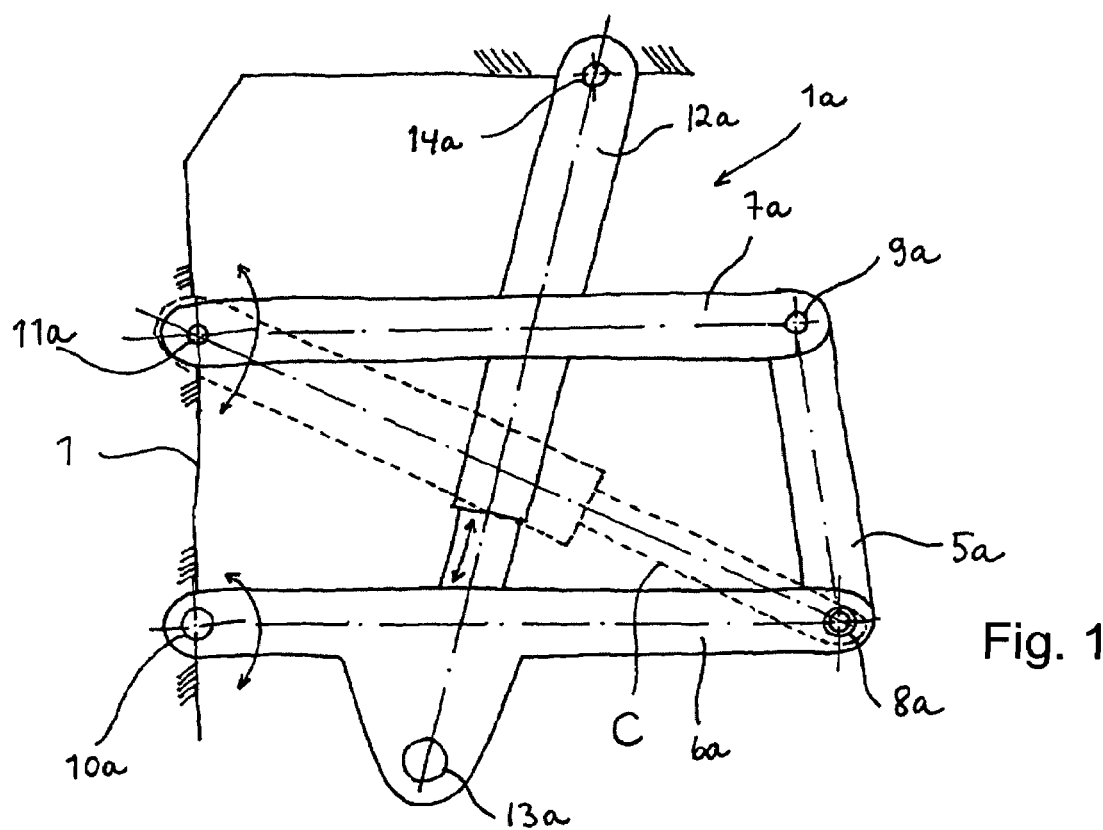
FIG. 1 shows the structure of a joint parallelogram in a reduced view and the suspension of a cylinder seen from the direction of the rotation axis.
Figure 2:
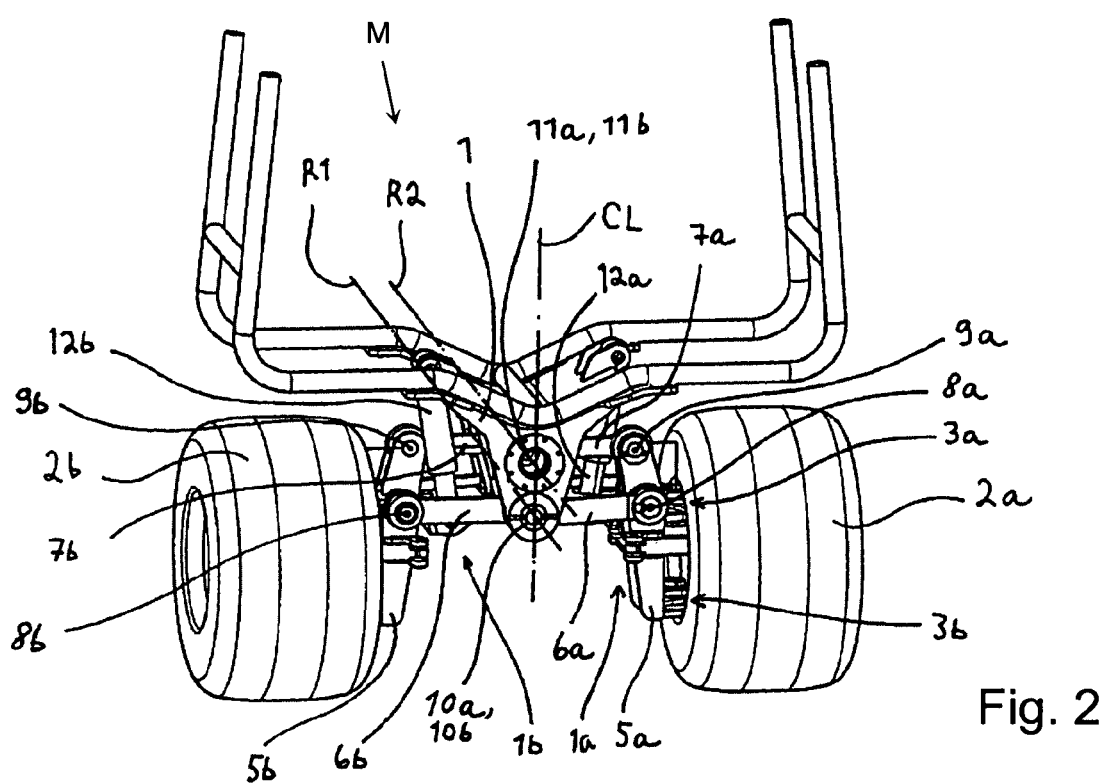
FIG. 2 shows a module according to an embodiment of the invention in a perspective view in the middle position of the wheels.

FIGS. 1 and 2 illustrate an arrangement according to the invention for the suspension of wheels. FIG. 1 shows, in a reduced view, one joint parallelogram applied in the invention, and its different arms in the middle position. FIG. 1 also shows the positions of suspension arms 6a and 7a and a cylinder actuator 12a for controlling the position of a mounting arm 5a in the vertical direction. A wheel is mounted to the mounting arm 5a as shown in FIG. 2. For comparison, the conventional placement of a cylinder C is also illustrated with a broken line. If the suspension arms of the joint parallelogram are parallel and equal in length, the position of the mounting arm and thereby the position of the wheel are changed as little as possible in the different positions of the joint parallelogram. Normally, the arms are unequal at least in length.

With reference to FIG. 2, the arrangement according to the invention comprises a frame part 1 placed on a vertical central line CL and forming part of a frame in a working machine intended to move on a terrain, such as a harvester, a forwarder or a combined machine. For example, a working machine for handling and transportation of timber comprises a front frame and a rear frame arranged to be movable by means of one or several pairs of wheels. The wheels are connected to the frame by means of a suspension according to the invention. The front frame is also equipped with a power source for the working machine, typically a diesel engine. The working machine is equipped with a mechanic hydrostatic transmission system.

Onto the front frame, a swivel base is mounted, onto which are also mounted a cabin and a boom assembly. The boom assembly is arranged for example in front of the cabin, and the end of the boom assembly can be connected to a tool, such as a harvester head. The frames are connected to each other by means of a joint which allows the turning of the frames with respect to each other around an axis in the longitudinal direction of the frame. Furthermore, on the rear frame, a load space is provided for the transportation of timber, such as delimbed and cut tree stems.

The arrangement according to FIG. 2 is further equipped with two substantially U-shaped bunks which are mounted on the frame part 1, wherein it forms part of said rear frame. A corresponding construction without the bunks can constitute a part of the front frame. The front end of the rear frame is also equipped with a timber shield which prevents timber loaded in the load space from gliding and colliding with the cabin. The timber shield and the bunks can also be arranged to be removable, to modify the load space.

The frame part 1 is supported by wheels 2a and 2b placed on its each side. The wheels 2a and 2b are normally pneumatic rubber tyres fitted on a removable rim. The rim is mounted, in a rotatable manner, on bearings, and in a way known as such, on a wheel center which is equipped with a motor, known as such, for rotating the rim with the wheel and thereby to move the working machine. The wheel rotates around a substantially horizontal axis. Furthermore, the wheel center is arranged to rotate around a substantially vertical axis, wherein the direction of movement of the working machine can be controlled by steering the wheel. The wheel center is rotated by means of cylinders driven by a pressurized medium. The arrangement comprises a substantially vertical mounting arm 5a where also the joints 3a and 3b are arranged.

The mounting arm 5a is mounted to the frame by means of an upper suspension arm 6a and an upper suspension arm 7a, which are substantially parallel. Each suspension arm 6a, 7a is mounted to the mounting arm 5a by means of a joint 8a or 9a, the joints allowing the rotation of the suspension arm in relation to the mounting arm around a substantially horizontal axis. Each suspension arm 6a, 7a is mounted to the frame 1 by means of a joint 10a or 11a, the joints allowing the swivelling of the suspension arm around a substantially horizontal axis. The suspension arms 6a and 7a as well as the joints 8a, 9a, 10a and 11a constitute a parallelogram-like structure, wherein in spite of the swivelling of the suspension arms, the mounting arm remains substantially vertical and the wheel 2a remains substantially in the same position, elevated to a different height. To increase the ground clearance, the wheel center is mounted close to the lower part of the mounting arm, and the suspension arms are mounted close to the upper part of the mounting arm.

According to an embodiment of the invention, the suspension arms 6a and 6b, placed on each side of the frame 1, are arranged to swivel around the same axis R1, by means of joints 10a and 10b, respectively. The joints 10a and 10b are thus preferably placed on said center line CL. The joint 10b of the suspension 1b corresponds to the joint 10a of the suspension 1a, and the suspensions correspond to each other also in other respects. The wheels 2a and 2b are preferably spaced by the same distance from the center line CL, and the corresponding arms of the different suspensions are preferably equal in length, wherein the suspensions of the wheels operate in the same way. Correspondingly, the suspension arms 7a and 7b, placed on each side of the frame 1, are arranged to swivel around the same rotation axis R2, by means of joints 11a and 11b, respectively. The joints 11a and 11b are thus preferably placed on said center line CL and above the joints 10a and 10b.

The more detailed structure of the joints may vary within the scope of the invention, but in the structure of FIG. 2, the joints 10a and 10b as well as the joints 11a and 11b are further placed one after the other in the direction of the axes R1 and R2. Thus, the suspension arms on different sides of the frame 1, for example the suspension arms 6a and 6b, are placed on different lines, wherein they can also be placed diagonally. For moving the suspension arms 6a and 6b, an actuator 12a operated by a pressurized medium, preferably a hydraulic cylinder, is coupled between the frame 1 and the lower suspension arm 6a, by means of joints 13a and 14a. The cylinder 12a is mounted above the upper suspension arm 7a and substantially in the vertical direction. The cylinder 12a is mounted between the joints 8a and 10a, wherein the cylinder 12a is placed in the free space between the frame 1 and the mounting arm 5a. By means of the actuator 12a, the suspension 1a is held in a desired position to support the frame 1 at a desired height. By means of the actuators 12a and 12b of the suspensions 1a and 1b, the frame 1 can also be kept horizontal on an uneven terrain. With the arrangement according to the invention, it is possible to reduce the total width of the working machine and thereby the module M according to FIG. 2.

According to an embodiment of the invention, the joint 10a of the suspension arm 6a, and its axis, are placed at a determined distance on the left side of the center line CL. The joint 10b of the suspension arm 6b, and its axis line, are placed at a corresponding distance but on the right side of the center line CL, wherein the suspension arms 6a and 6b can move diagonally. By this arrangement, the total width can be further reduced. Without reducing the width, it is, however, possible to increase the moment arm of the cylinder without changing the mounting points of the cylinder. For the simplicity of the construction, the suspensions preferably comply with FIG. 2, wherein the axes are joined and placed on the center line CL. Accordingly, the width of the frame 1 can be made as narrow as possible, particularly at the joints 10a, 10b and 11a, 11b.

The frame part 1 of the module M can be made in a desired length, wherein it can be directly connected to another corresponding module M to form the frame of the working machine. The module M can also be connected by means of a frame connector to another module M.

Figure 3:
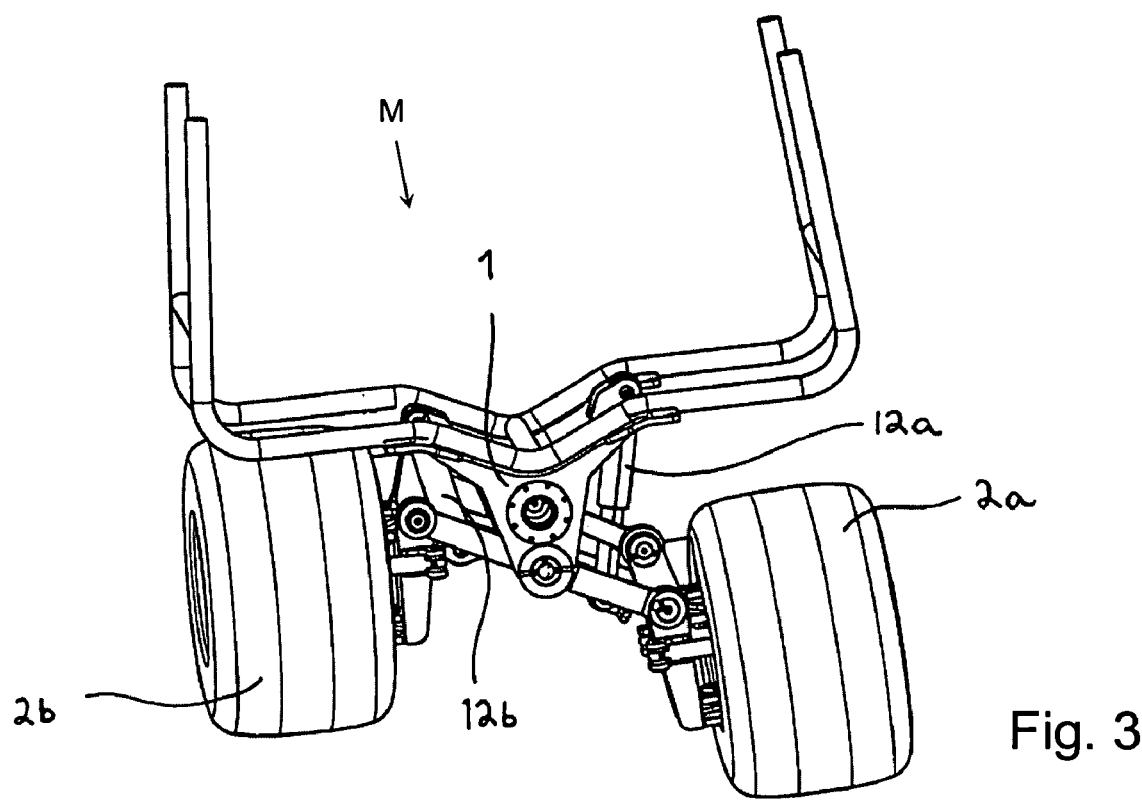
FIG. 3 shows the module of FIG. 1 in the upper and lower positions of the wheels.
Figure 4:
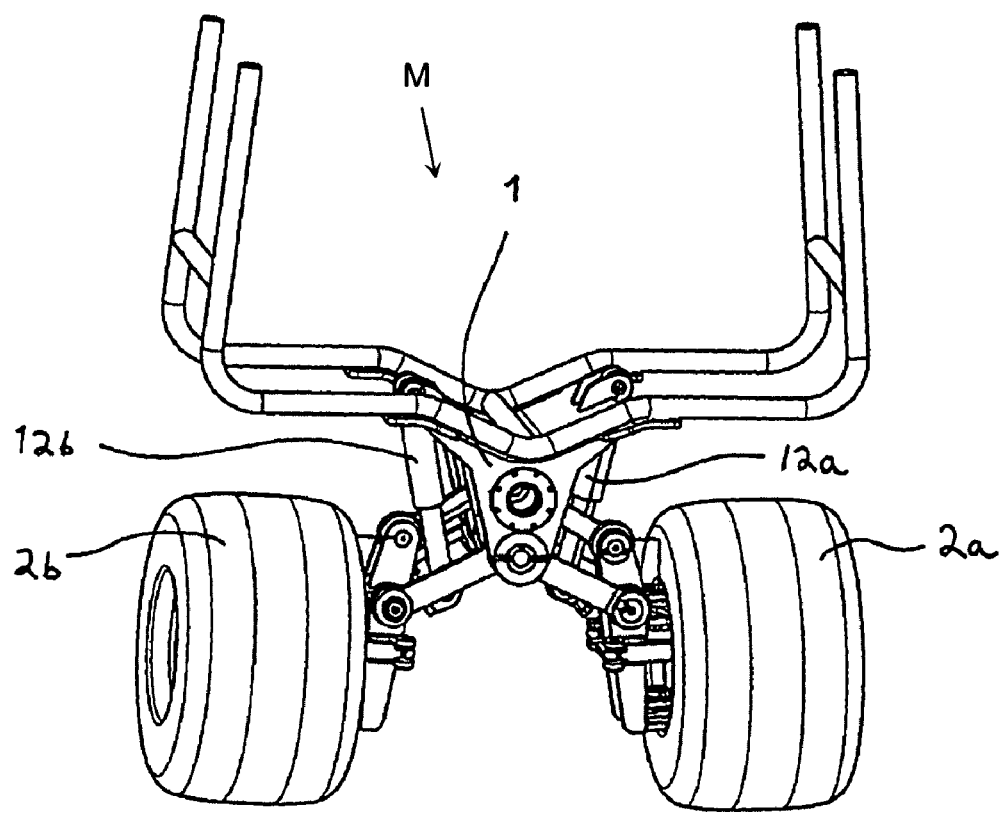
FIG. 4 shows the module of FIG. 1 in the lower position of the wheels.

To illustrate the operation of the suspension of the wheel according to the invention, FIG. 3 also shows the left wheel 2b in its uppermost position, wherein the cylinder 12b is steered to its shortened position, and the right wheel 2a is in its lowermost position, wherein the cylinder 12a is steered to its elongated position. In the presented manner, the frame 1 can be kept in balance, if the wheel 2b hits a bump on the terrain or if the wheel 2a hits a pit on the terrain. In FIG. 4, both of the wheels 2a and 2b are shown in their lowermost position, wherein the ground clearance of the working machine can be increased by adjusting the suspension.

The invention is not limited solely to the above-presented embodiment, but it can be modified within the scope of the appended claims.

The invention claimed is:

1. An arrangement for the suspension of wheels of a working machine moving on a terrain, the arrangement comprising:
   a pair of adjacent wheels arranged to support a frame part placed on a center line between the wheels;
   suspensions arranged between each wheel and the frame part to elevate and descend each wheel with respect to the frame part, wherein each suspension comprises a lower suspension arm and an upper suspension arm, which lower suspension arms are mounted by means of first joints to the frame part and by means of second joints to mounting arms, in which the wheels are mounted in a rotatable manner, and which upper suspension arms are fixed by means of third joints to the frame part and by means of fourth joints to the mounting arms,
   wherein, in each suspension, the first joint and/or the third joint is placed on said center line.

2. The arrangement according to claim 1, wherein the first joints and/or the third joints are arranged to be swivelled around the same axis.

3. The arrangement according to claim 2, wherein the first joints and/or the third joints of the suspensions are arranged one after the other in the longitudinal direction of the frame part.

4. The arrangement according to claim 1, wherein the wheels are mounted to the mounting arm in a turnable manner, wherein they are arranged to be turnable around a substantially vertical axis, and the wheel is arranged to be turned by means of a cylinder actuator coupled between the mounting arm and the wheel.

5. An arrangement for the suspension of wheels of a working machine movable on a terrain, the arrangement comprising:
   a pair of wheels arranged to support a frame part of the working machine, said wheels being placed on the opposite sides of the frame part and a longitudinal direction of the frame part;
   a pair of suspensions each connecting one of said wheels to the frame part to elevate and descend said wheel with respect to the frame part;
   wherein each said suspension comprises a lower suspension arm, an upper suspension arm, and a mounting arm, said lower suspension arm being mounted by means of a first joint to the frame part and by means of a second joint to a mounting arm, said upper suspension arms being mounted by means of a third joint to the frame part and by means of a fourth joint to the mounting arm, said wheel being mounted to the mounting arm;
   wherein said third joints of said pair of suspensions have a common axis of rotation parallel to said longitudinal direction.

6. The arrangement according to claim 5, wherein said first joints of said pair of suspensions have another common axis of rotation parallel to said longitudinal direction.

7. The arrangement according to claim 5, wherein said third joints of said pair of suspensions are placed one after the other along said common axis of rotation.

8. The arrangement according to claim 6, wherein said first joints of said pair of suspensions are placed one after the other along said common axis of rotation.

9. The arrangement according to claim 5, further comprising a pair of cylinder actuators each being coupled between said mounting arm and said wheel, to turn said wheel around a substantially vertical axis.

10. The arrangement according to claim 5, further comprising another pair of cylinder actuators each being coupled between said lower suspension arm and said frame, to elevate and descend said wheel.

11. The arrangement according to claim 1, wherein each said wheel is provided with a hub motor, to rotate said wheel.

12. The arrangement according to claim 1, wherein said frame part is a module structure connectable to another corresponding module structure, to form a bigger frame part of said working machine.

13. The arrangement according to claim 1, wherein said working machine is a harvester, a forwarder, or a combination of these.

14. An arrangement for the suspension of wheels of a working machine movable on a terrain, the arrangement comprising:
   a pair of wheels arranged to support a frame part of the working machine, said wheels being placed on the opposite sides of the frame part and a longitudinal direction of the frame part;
   a pair of suspensions each connecting one of said wheels to the frame part to elevate and descend said wheel with respect to the frame part,
   wherein each said suspension comprises a lower suspension arm, an upper suspension arm, and a mounting arm, said lower suspension arm being mounted by means of a first joint to the frame part and by means of a second joint to a mounting arm, said upper suspension arms being mounted by means of a third joint to the frame part and by means of a fourth joint to the mounting arm, said wheel being mounted to the mounting arm, wherein said first joints of said pair of suspensions have a common axis of rotation parallel to said longitudinal direction.

15. The arrangement according to claim 3, wherein said first joints of said pair of suspensions are placed one after the other along said common axis of rotation.

16. The arrangement according to claim 14, further comprising a pair of cylinder actuators each being coupled between said mounting arm and said wheel, to turn said wheel around a substantially vertical axis.

17. The arrangement according to claim 14, further comprising another pair of cylinder actuators each being coupled between said lower suspension arm and said frame, to elevate and descend said wheel.

18. The arrangement according to claim 14, wherein each said wheel is provided with a hub motor, to rotate said wheel.

19. The arrangement according to claim 14, wherein said frame part is a module structure connectable to another corresponding module structure, to form a bigger frame part of said working machine.

20. The arrangement according to claim 14, wherein said working machine is a harvester, a forwarder, or a combination of these.

* * * * *